(12) United States Patent
Wynen et al.

(10) Patent No.: US 6,647,583 B1
(45) Date of Patent: Nov. 18, 2003

(54) WIPER BLADE FOR CLEANING VEHICLE WINDSCREEN

(75) Inventors: Paul Wynen, Neerpelt (BE); Dirk Herinckx, Drieslinter (BE); Jurgen Roekens, Steenokkerseel (BE)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 09/806,099

(22) PCT Filed: Jul. 13, 2000

(86) PCT No.: PCT/DE00/02289

§ 371 (c)(1),
(2), (4) Date: May 24, 2001

(87) PCT Pub. No.: WO01/08947

PCT Pub. Date: Feb. 8, 2001

(30) Foreign Application Priority Data

Jul. 30, 1999 (DE) .......................... 199 35 859

(51) Int. Cl.[7] .................................. B60S 1/38
(52) U.S. Cl. .................. 15/250.48; 15/250.41
(58) Field of Search .......... 15/250.4, 250.41, 15/250.48, 245, 250.361

(56) References Cited

U.S. PATENT DOCUMENTS

| 2,926,375 A | * | 3/1960 | Flynn | ...................... 15/250.48 |
| 3,417,421 A | * | 12/1968 | Retke | .......................... 15/105 |
| 3,828,388 A | * | 8/1974 | Fuhr | ....................... 15/236.02 |
| 5,732,436 A | * | 3/1998 | Feigenbaum | ............. 15/250.41 |

FOREIGN PATENT DOCUMENTS

| DE | 30 05 965 A1 | 9/1981 | |
| DE | 44 10 446 A | 10/1994 | |
| EP | 0 635 411 A | 1/1995 | |
| NL | 7409913 | * 1/1976 | .............. 15/250.48 |
| WO | 94 20339 A | 9/1994 | |

\* cited by examiner

Primary Examiner—Gary K. Graham
(74) Attorney, Agent, or Firm—Michael J. Striker

(57) ABSTRACT

A wiper blade for cleaning motor vehicle windows has a wiper strip (12) which is held by a support bracket system (10) and is encompassed by a protective profile (14, 58) to which a wiper element (16, 18, 20, 22) is fastened on the side oriented toward the window. The protective profile (14, 58) is comprised of an elastic material and has the capacity to be largely adapted to curvatures of the window by means of elastic deformation.

3 Claims, 6 Drawing Sheets

WIPER BLADE FOR CLEANING VEHICLE WINDSCREEN

PRIOR ART

The invention is based on a wiper blade with a wiper strip that is held by a support bracket system and which is encompassed by a protective profile.

Known wipers have a wiper arm, which is comprised of a fastening part that is attached to a drive axle, a hinge part connected to it via a toggle joint, and a wiper rod rigidly connected to the hinge part. The wiper also has a wiper blade with a support bracket system and a wiper strip supported by this support bracket system. The wiper blade is attached to the wiper arm by virtue of the fact that a hook-shaped end of the wiper rod engages between two side walls of the support bracket system and encloses a hinge pin. The resulting hinge guides the wiper blade with the wiper strip over a motor vehicle window, wherein the hinge part and the support bracket system make it possible for the wiper strip to adapt to a curvature of the motor vehicle window. A required pressure of the wiper strip against the motor vehicle window is achieved with at least one tension spring which braces the fastening part and the hinge part together with the wiper rod by means of the toggle joint.

The wiper strip is comprised of an elastomer, e.g. a natural or synthetic rubber, or of ethylene propylene. It has a top strip which is connected via a tilting rib to a wiper lip that rests against the window to be wiped. By means of the tilting rib, the wiper lip can turn over at a reversal point of the wiping direction, into the opposite direction so that it always assumes a favorable angle in relation to the windshield. When the wiper is actuated, the wiper strip sweeps with the wiper lip across the motor vehicle window, wherein it gets worn down by friction between the wiper lip and the windshield. In addition, environmental influences act on the wiper strip, e.g. temperature fluctuations, UV radiation, salt water, exhaust, etc., which can lead to a premature aging of the material and to an increased wear.

A known strategy for assuring that the wiper strip is in perfect condition when a new motor vehicle is delivered is to cover the wiper strip with a protective profile before the vehicle is conserved. The protective profile is only removed when the new motor vehicle is transferred to a buyer after a final conservation. However, if the windshield becomes soiled or the visibility is hindered by rain when the motor vehicle is in temporary storage or during conservation, the windshield cannot be cleaned with the wiper system for purposes of maneuvering the vehicle. The protective profile is rigid, hard, and rests only partially against the windshield.

DE 30 05 965 A1 has proposed fastening the longitudinal edge of a flexible band to the side of the protective profile oriented toward the windshield. The protective profile is comprised of hard PVC and the band is comprised of soft PVC. If the wiper is actuated, the band is turned over more or less over the length of the wiper blade and is therefore in a position to adapt to the curvature of the windshield within certain limits. The band functions as a wiper lip, as a result of which the wiper system can be used to clean the windshield during maneuvers without using the actual wiper strip of the wiper blade. During conservation processes of the motor vehicle, however, the flexible band is frequently exposed to high temperatures. The band becomes embrittled, the elasticity is reduced, the turning process is impaired, and the wiping quality deteriorates.

ADVANTAGES OF THE INVENTION

The support bracket system of the wiper blade permits the wiper strip to adapt to curvatures of the windshield. A protective profile, which is comprised of an elastic material and can adapt largely, preferably completely, to curvatures of the windshield by means of elastic deformation, preserves the function of the support bracket system for the protective profile, which is otherwise lost when the protective profile is rigid. The wiper element, which is fastened with a bottom side to the protective profile, rests against the windshield uniformly over the length of the wiper blade during the wiping motion and a favorable wiping quality can be achieved. A turning over of the wiper element is not required for adaptation to the windshield. Instead of a tall, thin lip, which rapidly embrittles under the effects of heat, a wiper element can be used which has an approximately square, trapezoidal, or triangular cross-sectional area. Because of material accumulation, the wiper element is resistant to environmental influences, is particularly resistant to heat, and essentially retains its properties. Fundamentally, however, the turning over of a tall wiper element and/or the plastic and elastic deformation of the wiper can be used in conjunction with the elastically deformable protective profile to better adapt the wiper element to curvatures of the windshield. Preferably, the wiper element is comprised of a thermoplastic elastomer, i.e. of a combination of a thermoplastic and an elastomer. With a combination of this kind, particularly heat resistant materials can be produced, which can adapt favorably to curvatures of windshields by means of plastic and elastic deformation. Despite heat treatment with high temperatures or a conservation of the motor vehicle, a favorable wiping quality can be achieved with the wiper element.

The section modulus of the protective profile and the capacity to adapt to various curvatures of the windshield during the wiping motion depends on the material and the cross sectional geometry of the protective profile. The protective profile is preferably comprised of elastic plastic, in particular such as polypropylene, which remains elastically deformable at high temperatures of up to approx. 80° C. Plastic is reasonably priced, lightweight, and easy to process. Fundamentally, however, the protective profile can also be partially or completely made of metal.

The protective profile is comprised of a tubular or sleeve-shaped, elongated profile which encompasses the wiper strip with two side walls and is fastened with claw-like projections to the wiper strip or the wiper blade. One embodiment of the invention proposes a cross sectional geometry in which the profile tapers from the wiper strip toward the windshield and each side wall has one or several turning points, preferably two of them. The turning points constitute shoulder points for an elastic deformation, which encourage this elastic deformation. In addition, the elastic deformability is encouraged by means of a profile that is rounded toward the windshield, preferably in the shape of a pear, and by means of a wall thickness of less than 0.8 mm.

A known strategy for fastening the protective profile to the wiper blade in captive fashion and protecting the wiper strip laterally from environmental influences is to weld the protective profile shut laterally. To this end, the protective profile is heated on the lateral ends and is pressed against a plate. A material plate is produced which does close the protective profile but also stiffens it. In one embodiment, the proposal is made to close the protective profile in the longitudinal direction with a cover on at least one end, which can be used to advantageously open and close the protective profile a number of times for installation and removal. The cover can be slid onto the protective profile and can be fastened to the protective profile by means of a detachable frictionally and/or positively engaging connection. In addition, the cover can be connected to the protective profile in captive fashion and can be fixed in a closed position and/or an open position by means of detent means, for example in a cover, which is connected to the protective profile in captive fashion via a hinge, by means of a rotating motion, or in a cover which is connected to the protective profile via a strip, by means of a straight linear motion, etc.

The installation and removal of the protective profile is facilitated with the cover according to the invention and in particular, by means of a cover, a lateral stiffening of the protective profile can be largely prevented and the elastic deformability can be maintained, for example by virtue of the fact that the cover is fastened with play, can be displaced within limits, and/or rests only partially against the protective profile. Furthermore, the elastic deformability can be maintained by virtue of the fact that the entire end is not reshaped into a material plate, but rather, the protective profile is closed with a projection which is directed inward, lateral to the longitudinal direction and is formed onto a side wall of the protective profile. The projection is produced, for example, by means of a heat source or preferably by means of an ultrasonic source.

DRAWINGS

Other advantages ensue from the following description of the drawings. Exemplary embodiments of the invention are shown in the drawings. The drawings, the specification, and the claims contain numerous features in combination. The specialist will also suitably consider the features individually and will unite them in other logical combinations.

DESCRIPTION OF THE EXEMPLARY EMBODIMENTS

Figure 1:
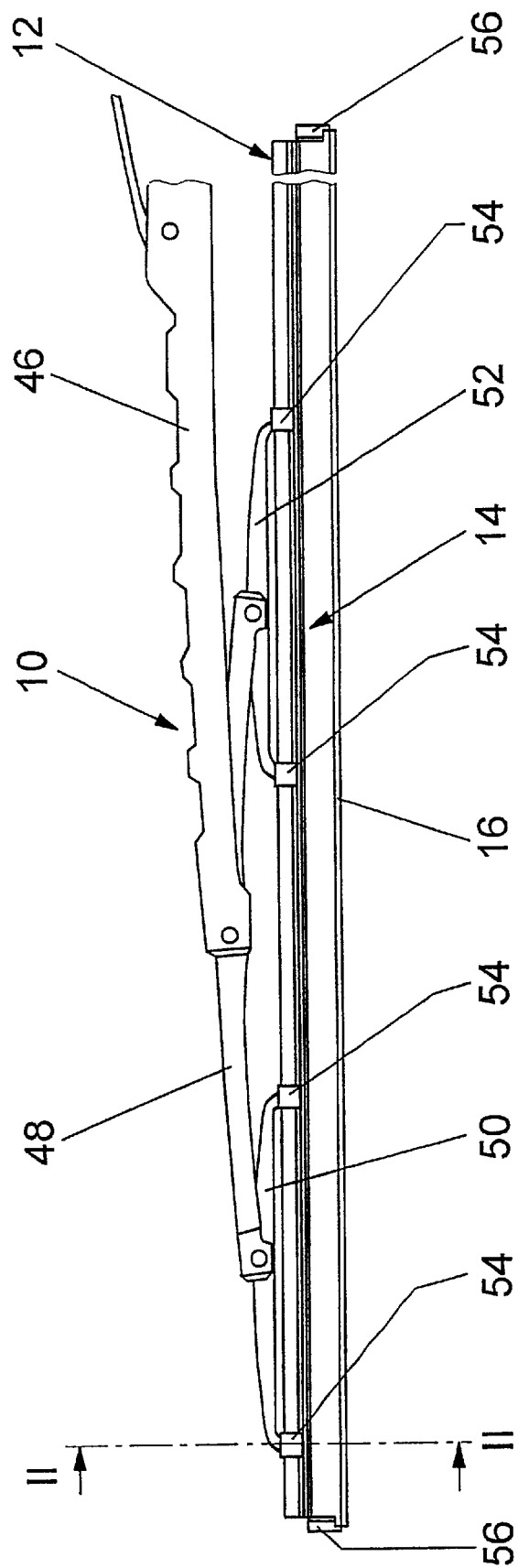
FIG. 1 shows a detail of a wiper blade.

FIG. 1 shows a detail of a wiper blade, which has a support bracket system 10 with a main bracket 46 that is pivotably connected to intermediary brackets 48 whose ends are connected to claw brackets 50, 52. A wiper strip 12 is held by securing claws 54 of the claw brackets 50, 52. In order to protect the wiper strip 12 from heat and other environmental influences before delivery to a buyer, it is encompassed by a protective profile 14 which has a wiper element 16 attached to its side oriented toward the windshield.

Figure 2:
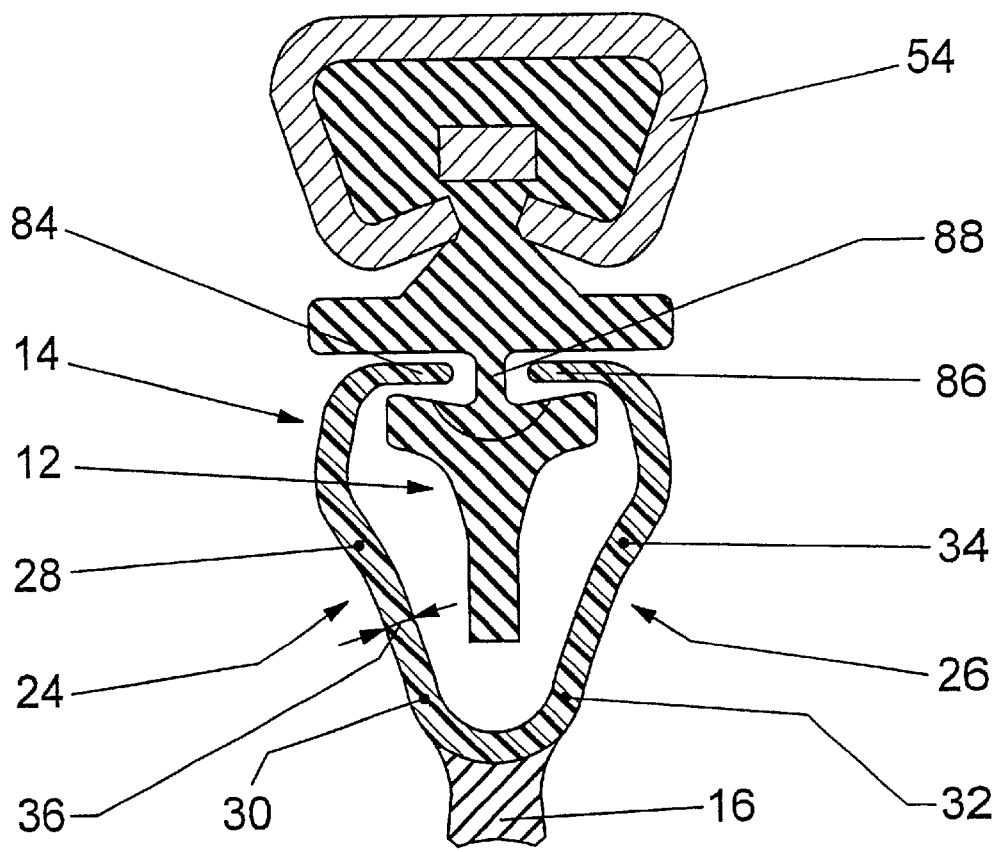
FIG. 2 shows a section along the line II—II in FIG. 1.

The protective profile 14 is comprised of an elastic plastic, namely polypropylene, and can be adapted to curvatures of the window by means of elastic deformation. The protective profile 14 has an elongated hollow profile with two side walls 24, 26 that encompass the wiper strip 12 and is fastened with claw-like projections 84, 86 to the wiper strip 12 in the vicinity of a tilting rib 88 and tapers from the wiper strip 12 toward the windshield (FIG. 2). Each side wall 24, 26, has two turning points 28, 30, 32, 34, which constitute shoulder points for an elastic deformation and encourage this deformation. It is also possible for there to be a number of turning points, for example wavy side walls. Furthermore, the elastic deformability is encouraged by means of a profile that is rounded toward the windshield, preferably in the shape of a pear, and by means of a wall thickness 94 of less than 0.8 mm. Advantageously, the wall thickness 36 is uniformly 0.6 mm in the exemplary embodiment shown, but it can be varied.

Figure 3:
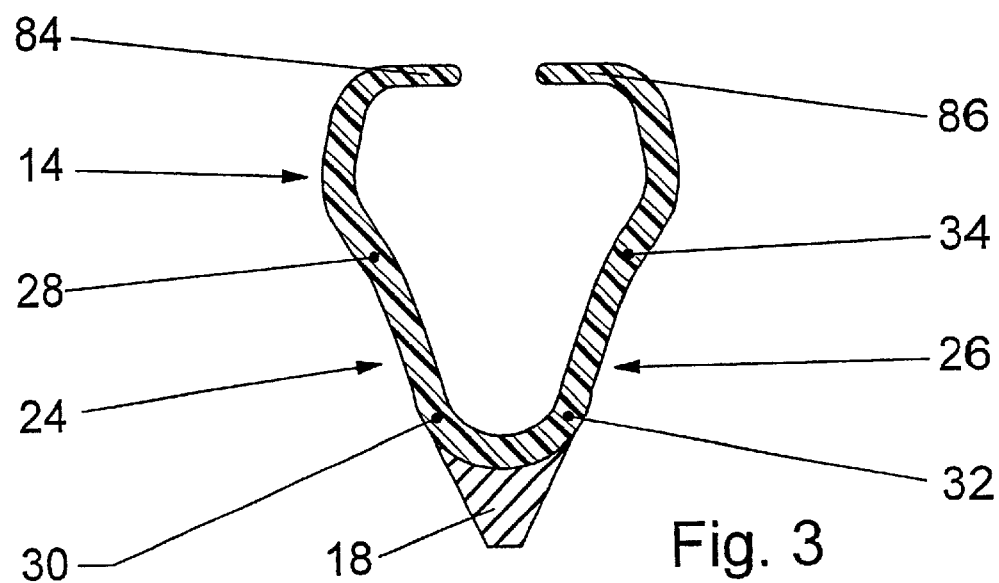
FIGS. 3–5 show variants of a protective profile according to FIG. 2.
Figure 4:
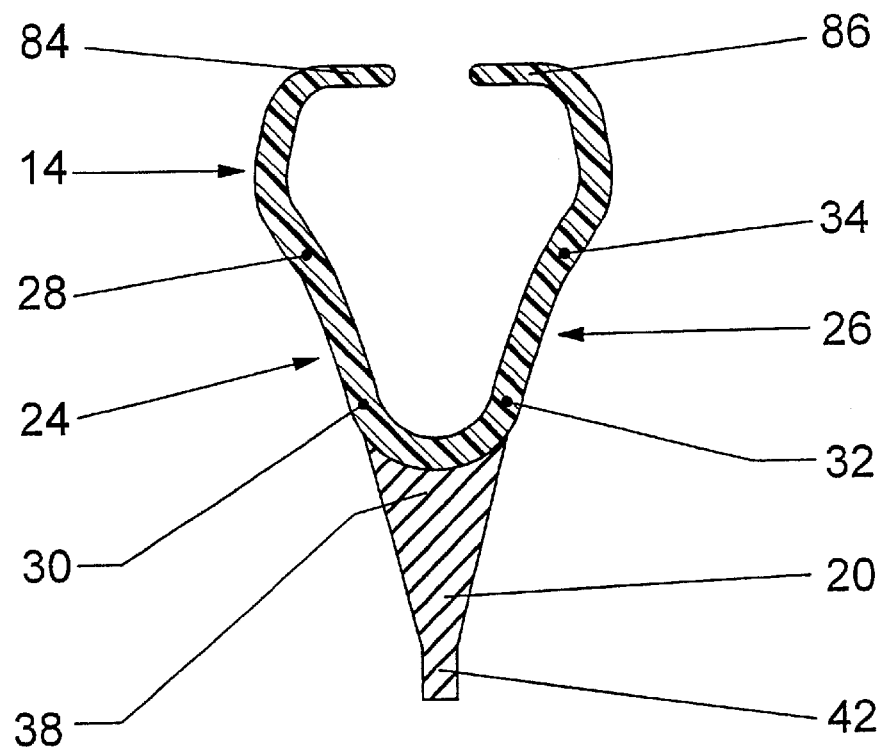
Figure 5:
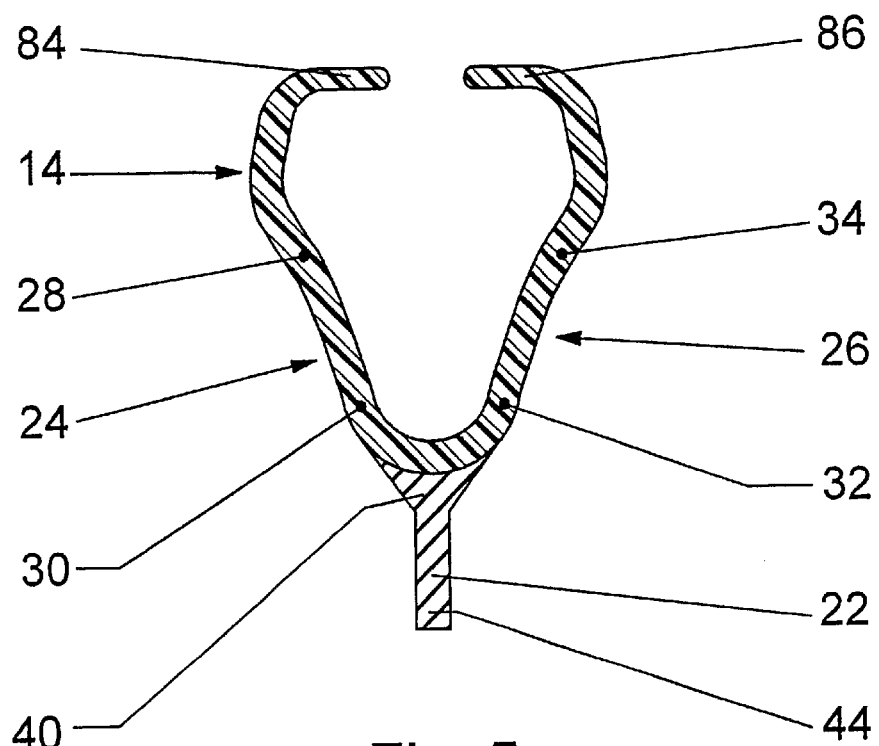

While the protective profile 14 is being extruded, the wiper element 16 on the protective profile 14 is extruded at the same time so that the wiper element 16 is fastened to the protective profile 14 by means of a chemical bond. This process produces a good connection without particularly high cost. However, it is also possible to connect the protective profile and the wiper element with frictional engagement, positive engagement, and/or material adhesion, for example by means of plugging, gluing, welding, etc. The wiper element 16 is comprised of a thermoplastic elastomer, i.e. of a combination of a thermoplastic and an elastomer. The wiper element 16 has an approximately square cross-sectional area and because of material accumulation, is resistant to environmental influences and is particularly resistant to heat. A similar effect is achieved with trapezoidal wiper element 18, as shown in FIG. 3. FIGS. 4 and 5 show protective profiles 14 with wiper elements 20, 22 which, on the side oriented toward the protective profile 14, are comprised of a trapezoidal region 38, 40 and on the side oriented toward the windshield, are comprised of a rectangular region 42, 44. Both wiper elements 20, 22 are embodied as tall so that when sweeping across the windshield, their turning over process can be favorably utilized for the adaptation to curvatures of the windshield in addition to the elastic deformation of the protective profile 14. Parts which remain the same are basically given the same reference numerals. The trapezoidal region 38, 40, which is embodied as taller in FIG. 4 than in FIG. 5, allows for a large connecting surface between the protective profile 14 and the wiper element 20 and 22 and permits a secure connection. Furthermore, in the upper regions that are more intensely loaded by bending stresses, a high degree of heat resistance is achieved.

Figure 6:
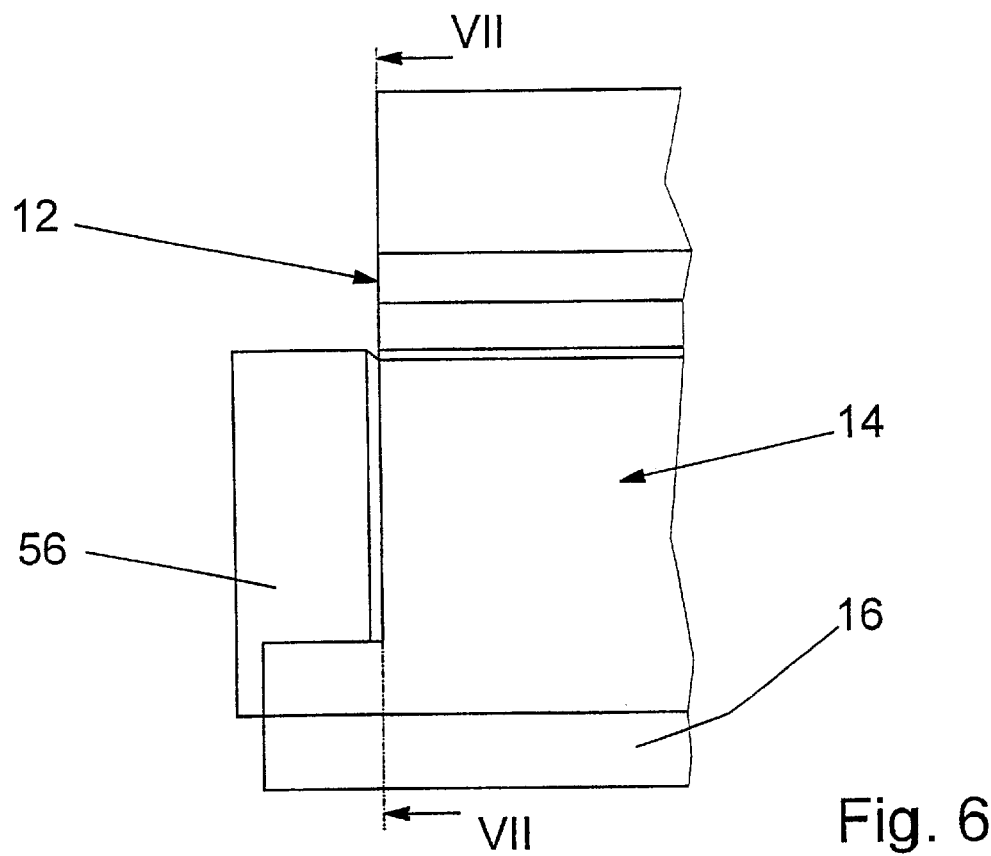
FIG. 6 shows an enlarged detail VI in FIG. 1.
Figure 7:
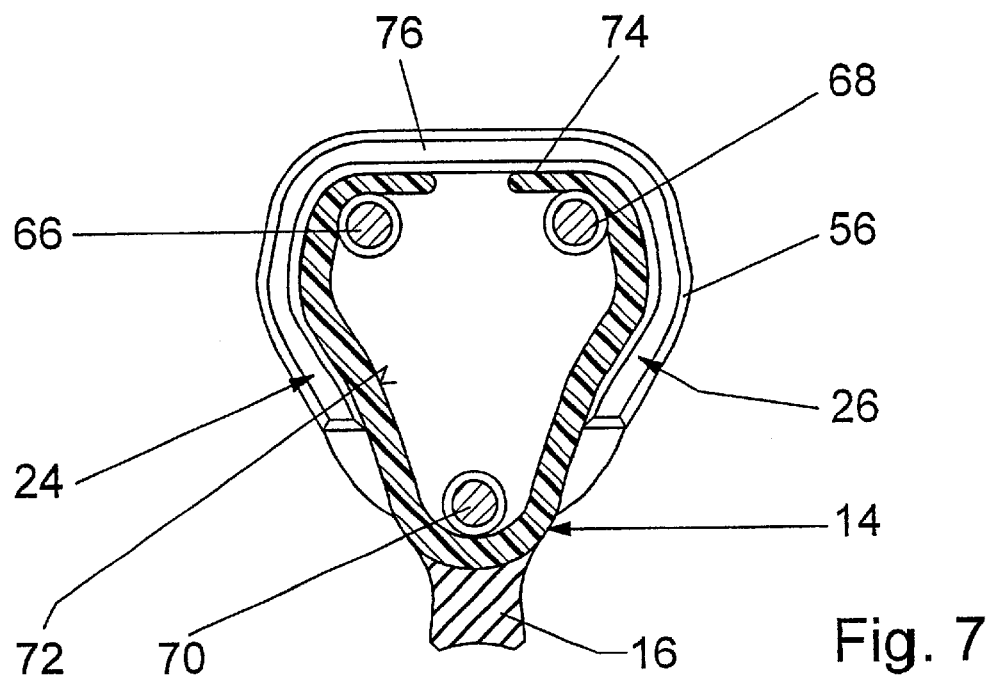
FIG. 7 shows a section along the line VII—VII in FIG. 6.
Figure 8:
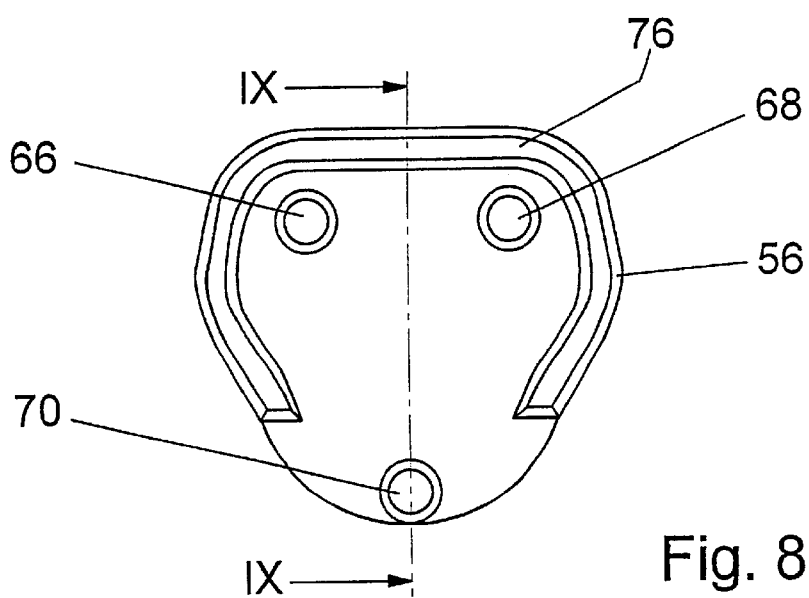
FIG. 8 shows a cover.
Figure 9:
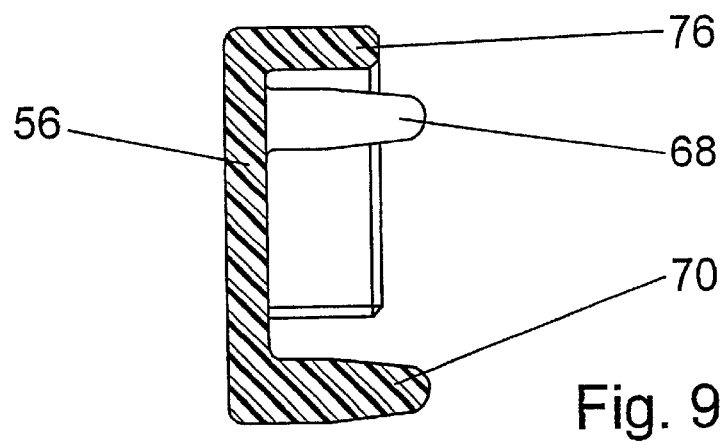
FIG. 9 shows a section along the line IX—IX in FIG. 8.

FIG. 6 shows an enlarged detail VI in FIG. 1. The protective profile 14 is closed at both ends in the longitudinal direction by a plastic cover 56. The cover 56 is slid onto the protective profile 14 and is detachably connected to it with frictional engagement by means of three pins 66, 68, 70 that rest against the inside 72 of the protective profile 14 and by means of a collar 76 disposed on the cover side 74 of the protective profile 14 (FIGS. 7, 8, and 9). The protective profile 14 is fastened to the wiper blade in captive fashion, the wiper strip 12 is protected laterally from environmental influences, and the protective profile 14 is easy to install and remove with the covers 56. In particular, a protective profile 14 that is closed at both ends can be used again with at least one cover 56 after being removed. In addition, the elasticity of the protective profile 14 is only affected to an insignificant degree by the cover 56 which rests only partially against the protective profile 14. The side walls 24, 26 can be deflected inward when there is an elastic deformation of the protective profile 14, without being hindered by the cover 56 (FIG. 7).

Figure 10:
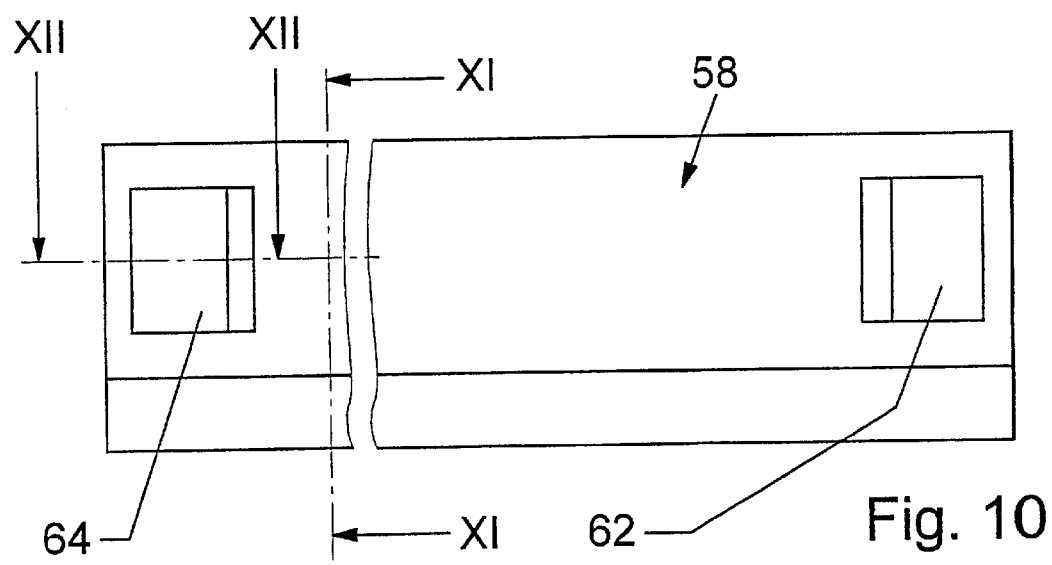
FIG. 10 shows a variant of a protective profile according to FIG. 1.
Figure 11:
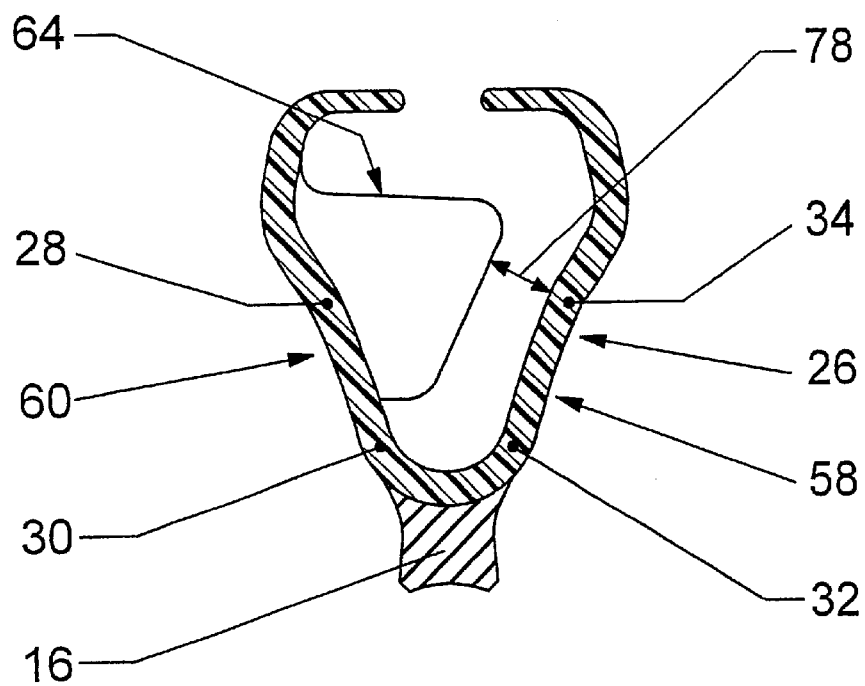
FIG. 11 shows a section along the line XI—XI in FIG. 10.
Figure 12:
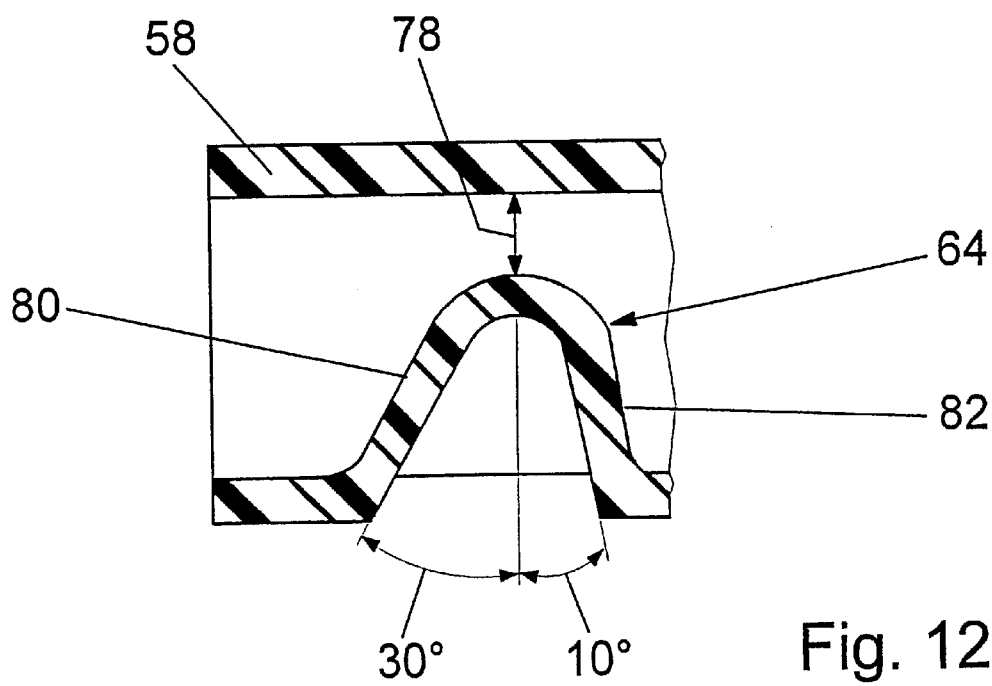
FIG. 12 shows a section along the line XII—XII in FIG. 10.

FIGS. 10, 11, and 12 show a protective profile 58 whose ends are closed with projections 62, 64 that are directed inward, lateral to the longitudinal direction. The projections 62, 64 are preferably produced in a side wall 60 of the protective profile 58 with an ultrasonic source. The length of the projection 62, 64 decreases toward the windshield in such a way that an approximately uniform gap 78 is produced between the projection 62, 64 and the side wall 26, and this gap can be used to guide the wiper strip 12 without damaging it, during installation and removal (FIG. 11). The projections 62, 64 taper lateral to the longitudinal direction and oriented toward the end face, have an inwardly inclined first, flatter bevel 80 of 30°, which deflects the wiper strip 12 toward the gap 78 during installation and makes the installation easier (FIG. 12). Moreover, in the longitudinal direction toward the inside, the projections 62, 64 have a second, outwardly inclined, steeper bevel 82 of 10°, which assures a secure fastening of the protective profile 58 to the wiper strip 12 during the operation of the wiper and facilitates a non-damaging removal.

The projections 62, 64 are used to fasten the protective profile 58 to the wiper blade in a captive and reusable fashion and the wiper strip 12 is protected laterally from environmental influences. The projections 62, 64 extend only over a small part of the circumference of the protective profile 58 so that the elastic deformability is only slightly impaired.

What is claimed is:

1. A wiper blade for cleaning motor vehicle windows, having a wiper strip (12) which is held by a support bracket system (10) and Is encompassed by a protective profile (14, 58) to which a wiper element (16, 18, 20, 22) is fastened on a rounded side oriented toward the window, characterized in that the protective profile (14, 58) is comprised of polypropylene and can be largely adapted to curvatures of the window by means of elastic deformation, and wherein the wiper element has a shape selected from the group consisting of triangular, trapezoidal, and approximately square cross section, wherein on at least one end, the protective profile (58) is closed with a projection (62, 64) that is directed inward, lateral to a longitudinal direction, said projection (62, 64) being formed onto a side wall (60) of the protective profile (58), and wherein a gap (78) is formed between the projection (62, 64) and an opposite side wall (26).

2. The wiper blade according to claim 1, wherein the wiper element (16, 18, 20, 22) is comprised of a thermoplastic element.

3. The wiper blade according to claim 1, wherein the protective profile (14, 58), at least in part, has a wall thickness (36) of less than 0.6 mm and wherein each side wall (24, 26, 60) least two turning points (28, 30, 32, 34).

* * * * *